Patented Apr. 29, 1952

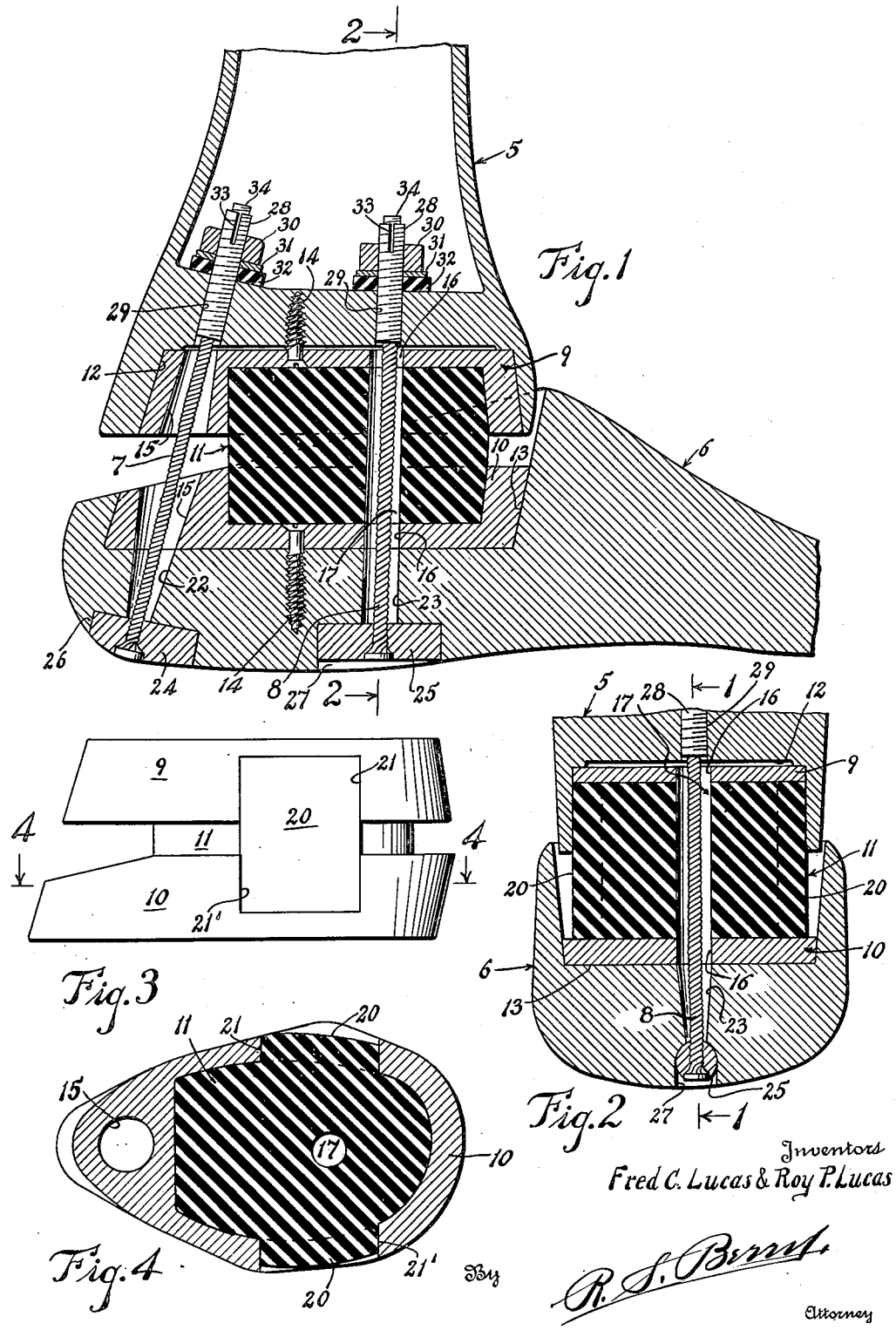

2,594,945

UNITED STATES PATENT OFFICE 2,594,945

ANKLE JOINT FOR ARTIFICIAL LEGS

Fred C. Lucas and Roy P. Lucas,
Los Angeles, Calif.

Application April 27, 1949, Serial No. 89,856

8 Claims. (Cl. 3—6)

This invention has for an object the provision of an improved ankle joint for artificial legs which is constructed and arranged in such manner that it will provide the desired cushioning action, flexibility and natural foot movements over comparatively long periods of time without requiring replacement of parts thereof.

Another object of this invention is to provide an improved ankle joint wherein a pair of socket members and a rubber cushion block seated in the socket members are of such construction and arrangement as to minimize wear and damage of the cushion block and contribute toward a strong and durable joint of comparatively light weight without sacrificing the desired flexibility and cushioning action.

A further object is to provide a joint such as described wherein the rubber cushion block is maintained between the socket members in "floating" relation thereto without the use of rivets, screws or like fastening elements, there being lateral extensions of the block so located and related to the socket members as to provide for a controlled yielding and cushioning action of the block and prevent undesirable sidewise rocking movements and other undesirable or unnatural movements of the foot member.

Another object of this invention is to provide an ankle joint of the character described in which flexible tie elements for connecting the foot member to the leg member are arranged so that they may readily be adjusted to regulate the action of the rubber cushion block for controlling the movements of the foot member best to suit the particular wearer of the artificial leg.

A further object is to provide in an ankle joint such as described an anchoring means for the flexible tie elements joining the foot and leg members, which will prevent the weakening and breaking of such elements which heretofore occurred due to bending of the elements adjacent the point of anchorage thereof.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a sectional view of an artificial leg having an ankle joint embodying our invention, taken on the plane of line 1—1 of Fig. 2, Fig. 2 is a fragmentary vertical sectional view taken on the plane of line 2—2 of Fig. 1, Fig. 3 is a side elevation of the ankle joint assembly as removed from the artificial leg, Fig. 4 is a horizontal sectional view taken on the plane of line 4—4 of Fig. 3.

Referring to the drawing more specifically 5 designates the leg member of an artificial leg to which a foot member 6 is flexibly connected by means of flexible tie elements 7 and 8, and an ankle joint assembly which latter includes complementary socket members 9 and 10 and a resilient rubber or synthetic rubber cushion block 11 seated in the socket members.

As here shown the socket members 9 and 10, which may be made of any suitable light metal or of plastic material, are countersunk in recesses 12 and 13 in the opposed portions of the leg and foot members respectively, being held in place by means of like screws 14 with the socket cavities thereof substantially in registration with one another. Each of these socket members is substantially pear shaped with the larger end placed toward the instep portion of the artificial foot and leg assembly to correspond to the shape of a natural ankle.

Each of the socket members is provided at the smaller end thereof with an opening 15 through which the tie element 7 extends, said openings being of such size as to permit a free movement of the flexible tie element in all directions. The other tie element 8 extends through like openings 16 in the socket members and a bore 17 in the block 11. The openings 16 are located in the socket cavities and register with the bore 17, said openings and bore being of such greater size than the diameter of the tie element 8 that the latter will be permitted free movement in all directions.

The solid cushion block 11 is elongated and fits snugly in the socket members so that said members will be spaced apart at all times. The front end of the block 11 is rounded whereas the rear end is square and the sides have a slight radius, this shape conforming to the shape of the socket cavities.

In accordance with our invention like lateral extensions 20 of the rubber cushion block are provided intermediate the ends of the block on opposite sides thereof and are seated in recesses or notches 21 and 21' in side walls of the socket members. These extensions are equal in thickness to that of the block proper and are substantially rectangular, being squarely and tightly fitted in said recesses or notches. They have a fore and aft extension equal to approximately one-half of the length of the block, although these proportions may be varied provided that the extensions afford a considerable widening of the block at what is approximately the fulcrum point of the ankle joint and serve the other purposes herein described. This widening of the block inhibits a too free sidewise rocking of the foot member, yet permits of desired rocking movement under the resistance of the block. These extensions also serve to securely anchor the block against displacement and to resist a too free fore and aft motion of the foot member. In having the block 11 in a "floating" relation to the socket members and of the particular solid formation here shown, a proper cushioning and flexing action is afforded without weakening or damaging the block to the extent that frequent replacement thereof would be required as has heretofore been the case with cushion blocks having notches and other formations creating weak points therein or which are directly fastened to the socket members by screws or other fastenings.

It should be noted that the tie members 7 and 8 are freely movable in bores 22 and 23 in the foot member 6 and are fastened at their lower ends to anchor members 24 and 25 which are countersunk in recesses 26 and 27 in the bottom of the foot member. These anchor members are circular in cross section as are the recesses in which they are engaged so that they will turn to prevent critical bending of the flexible tie members at and adjacent points of fixation of the flexible members to the anchor members, which bending would cause weakening and breaking at such points. The anchor members 24 and 25 will turn with the movements of the flexible tie members, thereby preventing the weakening bending actions which would take place if the bearing members were immovably fixed to the foot member.

The leg member 5 is hollow and the flexible members 7 and 8 have screw threaded elements 28 fixed on their upper ends and which extend through bores 29 in the leg member and into the hollow portion of the leg member. Nuts 30 are turned on the screw threaded members 28 and bear against washers 31 seated on rubber members 32 to secure the tie members to the foot member. The tightening or loosening of the tie members according to manipulation of the nuts 30 will regulate the cushioning action as well as the flexibility of the block 11, best to suit the wearer of the artificial leg. If a comparatively stiff foot movement is desired the nuts are tightened to compress the rubber block. The screw threaded members 28 are split as at 33 and provided with set screws 34 operable to expand the split portions to lock the nuts against loosening thereby making it possible to maintain the desired adjustments.

It will now be seen that the flexible tie elements 7 and 8 and the cushion block 11 which is interposed between the foot and leg members 5 and 6 are the sole means of connection between said members and provide for natural foot and ankle movements while inhibiting unnatural foot and ankle movements.

The particular solid formation of the cushion block 11 and the wing-like lateral extensions 20 seated in recesses in the walls of the socket members make it possible to provide a durable and flexible cushion which affords a controlled movement of the foot member within natural foot-movement limits without subjecting the cushion to objectionable or damaging wear at any critical point which would necessitate frequent replacement thereof.

We claim:

1. In an ankle joint for artificial legs wherein a leg member and a foot member are flexibly connected, socket members adapted to be secured to opposed portions of said foot and leg members in position to provide opposing sockets, each of said socket members having recesses in opposite walls thereof, a resilient rubber cushion block seated in said socket members, and integral extensions on opposite sides of said block seated in said recesses.

2. In an ankle joint for artificial legs, a pair of socket members adapted to be secured to opposed portions of the leg and foot members of an artificial leg in position to provide opposing sockets, a resilient cushion block seated in said socket members and holding the socket members spaced from one another, said socket members having side walls formed with opposed lateral rectangular recesses, and rectangular extensions projecting laterally from opposite sides of said block and seated within the recesses in said socket members.

3. In an ankle joint for artificial legs, a leg member, a foot member, flexible tie elements connecting said leg and foot members, opposed socket members fixed to opposed portions of said leg and foot members in position to provide opposing sockets, a rubber cushion block seated in said socket members and holding the socket members in spaced relation to one another, said socket members having side walls formed with opposed lateral rectangular notches, and lateral extensions on said cushion block bearing within said notches.

4. In an ankle joint for artificial legs, a leg member, a foot member, flexible tie elements connecting said leg and foot members, opposed socket members fixed to opposed portions of said leg and foot members in position to provide opposing sockets, a rubber cushion block seated in said socket members and holding the socket members in spaced relation to one another, and lateral square extensions on said cushion block, said socket members having lateral recesses therein in which said extensions are seated.

5. In an ankle joint for artificial legs, a leg member, a foot member, elongated socket members fixed to said leg and foot members and having their socket cavities opposed to one another, an elongated rubber cushion block seated in said socket members and holding said socket members in spaced relation to one another, flexible tie elements connecting said leg and foot elements, said socket members having openings through which said tie elements extend and are freely movable on relative movement of said foot and leg members, and anchor members seated in said foot member so as to turn about axes substantially at right angles to the axes of tie elements, and to which the lower ends of said tie elements are fixed.

6. In an ankle joint for artificial legs, a leg member, a foot member, elongated socket members fixed to said leg and foot members and having their socket cavities opposed to one another, an elongated rubber cushion block seated in said socket members and holding said socket members in spaced relation to one another, flexible tie elements connecting said leg and foot elements, said socket members having openings through which said tie elements extend and are freely movable on relative movement of said foot and leg members, said socket members having laterally recessed walls, and lateral extensions intermediate the ends of said cushion blocks seated in said recesses.

7. In an ankle joint for artificial legs, a leg member, a foot member, elongated socket members fixed to said leg and foot members respectively and having their socket cavities opposed to one another, an elongated rubber cushion block seated in said socket members and holding said socket members in spaced relation to one another, flexible tie elements connecting said leg and foot elements, said socket members having openings through which said tie elements extend and are freely movable on relative movement of said foot and leg members, and lateral extensions on opposite sides of said block at points intermediate the ends of the block, said socket members having lateral recesses in which said extensions are seated.

8. The structure called for in claim 7 in which said lateral extensions and the recesses in which they are seated are rectangular and the extensions tightly fitted in the recesses.

FRED C. LUCAS.
ROY P. LUCAS.

REFERENCES CITED

The following references are of record in the file of this patent:

UNITED STATES PATENTS

| Number | Name | Date |
|---|---|---|
| 25,238 | Bly | Aug. 30, 1859 |
| 487,697 | Ehle | Dec. 6, 1892 |
| 2,315,795 | Johnson et al. | April 6, 1943 |

FOREIGN PATENTS

| Number | Country | Date |
|---|---|---|
| 139,936 | Great Britain | March 18, 1920 |